US007997666B2

(12) United States Patent
Bordini

(10) Patent No.: US 7,997,666 B2
(45) Date of Patent: Aug. 16, 2011

(54) CRAWLER TRACTION DEVICE

(75) Inventor: Giorgio Bordini, Modena (IT)

(73) Assignee: CNH America LLC, New Holland, PA (US)

( * ) Notice: Subject to any disclaimer, the term of this patent is extended or adjusted under 35 U.S.C. 154(b) by 245 days.

(21) Appl. No.: 12/126,282

(22) Filed: May 23, 2008

(65) Prior Publication Data
US 2009/0021073 A1    Jan. 22, 2009

(30) Foreign Application Priority Data

May 23, 2007   (IT) .............................. TO2007A0364

(51) Int. Cl.
*B62D 55/00* (2006.01)

(52) U.S. Cl. .................... 305/150; 305/139; 305/141

(58) Field of Classification Search .......... 305/124–131, 305/139, 141, 143, 150, 144–149, 151–156
See application file for complete search history.

(56) References Cited

U.S. PATENT DOCUMENTS

| 2,049,858 A * | 8/1936 | Norelius et al. ............. 305/124 |
| 4,506,934 A * | 3/1985 | Hammond .................... 305/125 |
| 2003/0189377 A1 * | 10/2003 | Wright et al. ................. 305/124 |

FOREIGN PATENT DOCUMENTS

| EP | 0810149 | 12/1997 |
| EP | 1666345 | 6/2006 |

* cited by examiner

*Primary Examiner* — Jason R Bellinger
(74) *Attorney, Agent, or Firm* — Patrick M. Sheldrake; Michael G. Harms

(57) ABSTRACT

A crawler traction device for a crawler vehicle, in particular a tractor, the device having a carriage, a drive sprocket rotating about a first axis, an idler wheel rotating about a second axis parallel to the first axis. The track is looped about the drive sprocket and the idler wheel and meshes with the drive sprocket along a meshing arc. The traction device has a noise and vibration damping device having an auxiliary roller which rotates about a third axis parallel to the first axis and is eccentric with respect to the drive sprocket as well as smaller in diameter than the drive sprocket. The noise and vibration damping device only cooperates with the track along a portion of the track located, in use, immediately upstream from the meshing arc and interposed between the auxiliary roller and the terrain.

24 Claims, 10 Drawing Sheets

CRAWLER TRACTION DEVICE

TECHNICAL FIELD

The present invention relates to a crawler traction device. More specifically, the present invention relates to a crawler traction device for a crawler vehicle.

BACKGROUND OF THE INVENTION

Typically tractors with a crawling device have a rear drive sprocket fitted to the frame to rotate about a first axis crosswise to the longitudinal axis and a front idler mechanism fitted to the carriage to rotate about a second axis parallel to the first axis. A track is looped about the drive sprocket and the front idler and meshes with the drive sprocket along a meshing arc, and a damping device for reducing vibration and noise produced by the moving vehicle. The damping device generally has a damping roller fitted to the drive sprocket and rotating about a third axis.

In a crawler traction device of the above type, the track normally comprises a chain of metal links, each of which comprises a shoe having grip ribs on the outside, and forks on the inside for hinging it to the adjacent links by transverse pins. In use, the teeth on the drive sprocket engage the link pins to produce the characteristic caterpillar movement of the track and so propel the vehicle.

Meshing of the drive sprocket with the links represents a major source of noise and vibration, on account of the drive sprocket—which rests on the ground, with the interposition of the track, along the portion of the meshing arc tangent to the ground—moving continually up and down, as it rotates, with respect to the track. In other words, whenever a tooth on the drive sprocket engages the gap between the pins connecting two adjacent links along the portion of the meshing arc tangent to the ground, the drive sprocket slumps sharply onto the track, thus producing noise and vibration.

The traction device as described in EP0810149B, attempts to solve this problem and is equipped with a damping device comprising a damping roller, which is coaxial with the drive sprocket and of such a diameter that its peripheral surface permanently contacts the inner surface of the shoes along the whole of the meshing arc, so as to form a gap, along the whole of the meshing arc, between the base surface of the drive sprocket and the track pins and so prevent the drive sprocket from impacting the pins.

In actual use, however, the above solution has serious drawbacks, due to the damping roller preventing the drive sprocket from meshing correctly with the track.

SUMMARY OF THE INVENTION

The present invention contemplates a crawler traction device for a crawler vehicle, in particular a tractor. The crawler traction device has a frame; a carriage having a longitudinal axis; a rear drive sprocket fitted to the frame to rotate about a first axis crosswise to the longitudinal axis and a front idler; fitted to the carriage to rotate about a second axis, parallel to the first axis. The track is looped about the drive sprocket and the front idler and meshes with the drive sprocket along a meshing arc. The traction device further has a damping device for reducing vibration caused in use by the moving vehicle. The damping device has an auxiliary roller rotating about a third axis. The auxiliary roller is eccentric with respect to the drive sprocket, is smaller in diameter than the drive sprocket, and only cooperates with the track along a portion of the track located, in use, immediately upstream from the meshing arc and interposed between the auxiliary roller and the terrain.

Another embodiment provides for a crawler traction device having a damping device. The damping device has a pair of front rollers; which are located on opposite sides of an idler wheel to rotate about respective axes; of rotation parallel to each other and to the second axis, are eccentric with respect to the idler wheel, have respective diameters smaller than that of the idler wheel, and only cooperate with the track along an initial portion of the winding arc of the track about the idler wheel.

A still further embodiment of the invention provides for; a crawler traction device wherein the idler defines a front portion of the damping device, and comprise a pair of identical front rollers fitted to a fork to rotate about the second axis. The fork is connected to the carriage by a tensioning device to allow the front rollers to slide in a direction parallel to the longitudinal axis.

It is an object of the present invention to provide a crawler traction device designed to reduce the noise and vibration produced by the moving track, and to eliminate the aforementioned drawbacks.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

Figure 1:
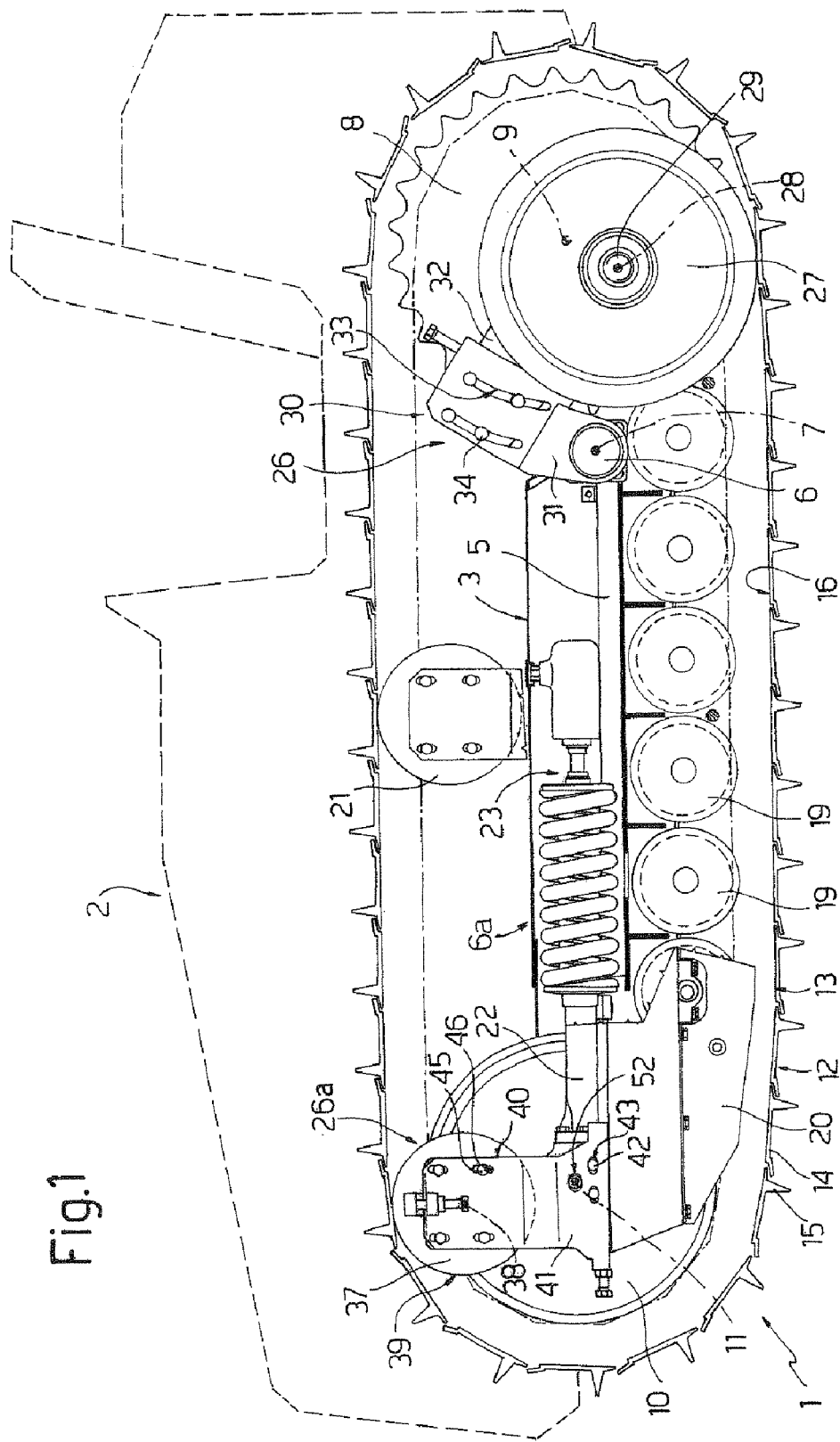
FIG. 1 shows a side view, with parts removed for clarity, of a first embodiment of the crawler traction device according to the present invention.

FIG. 1 shows a crawler traction device 1 for a crawler vehicle 2, in particular a tractor. Traction device 1 comprises a carriage 3 having a longitudinal axis 4, and in turn comprising a longitudinal beam 5, which extends parallel to axis 4 and is connected to a similar longitudinal beam (not shown) of a further crawler tractor device (not shown) of vehicle 2 by a cross member 6, which has an axis 7, crosswise to axis 4, and forms part of a frame 6a of vehicle 2.

Traction device 1 also comprises a rear drive sprocket 8 fitted to frame 6a to rotate, with respect to frame 6a, about an axis 9 parallel to axis 7; a front idler wheel 10 fitted to carriage 3 to rotate, with respect to carriage 3, about an axis 11 parallel to axis 7; and a track 12 looped about drive sprocket 8 and idler wheel 10, and meshing with drive sprocket 8 along a meshing arc.

Figure 2:
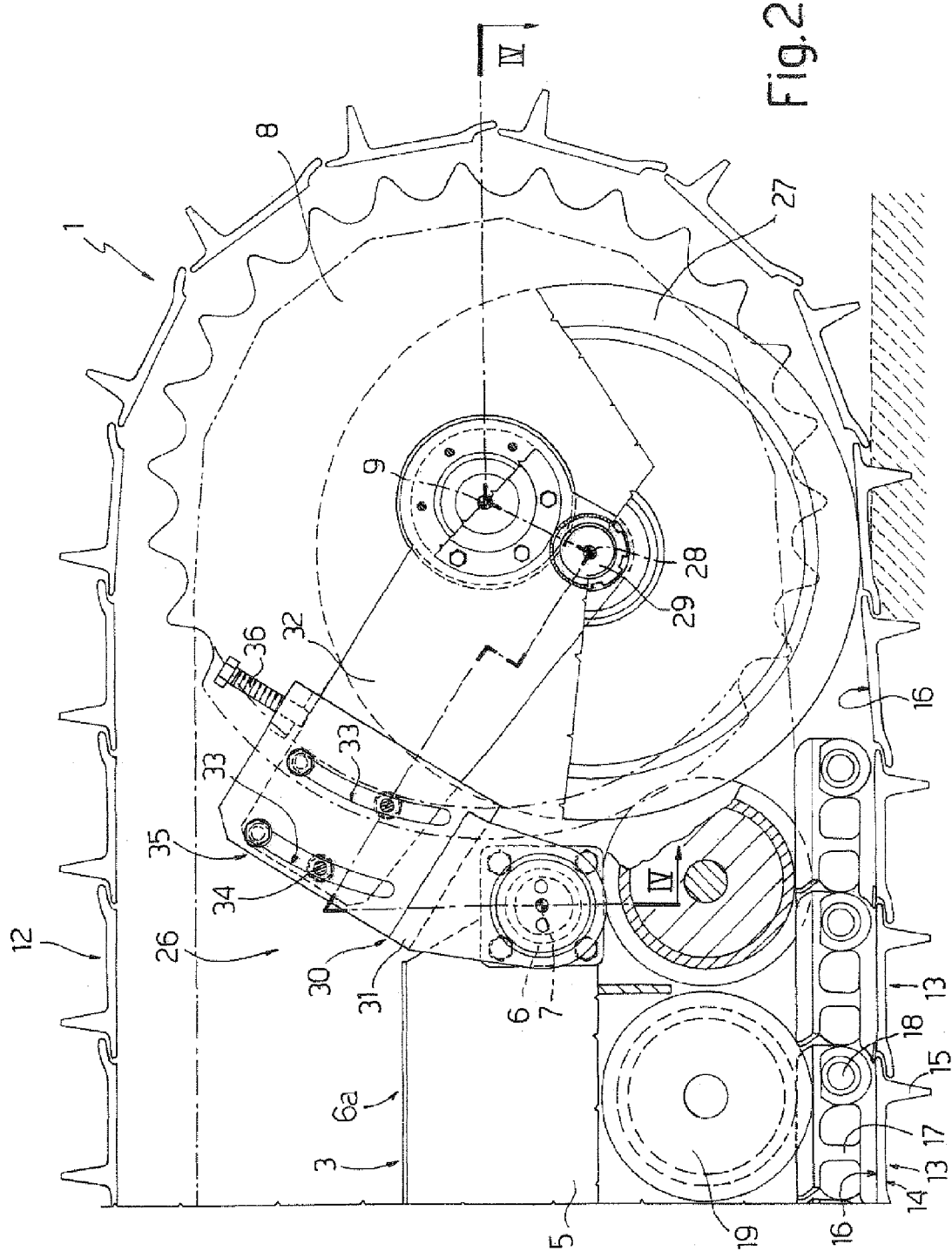
FIG. 2 and FIG. 3 show larger-scale views of the crawler traction device of FIG. 1 in respective operating configurations.

As shown in more detail in FIG. 2, track 12 is defined by a chain of known metal links 13, each of which comprises a shoe 14 bounded internally by a surface 16 and having a grip rib 15 on the outside; and a central connecting member 17 connecting link 13 to an adjacent link 13 by a pin 18 crosswise to longitudinal axis 4.

As shown in FIG. 1, between drive sprocket 8 and idler wheel 10, carriage 3 is fitted with a number of carrier rollers 19 arranged in pairs, and each pair of which comprises an inner roller and an outer roller (only the outer roller shown) rotating about a respective axis parallel to axis 7, and positioned with their respective peripheral surfaces contacting links 13 to maximize grip of track 12 on the terrain and so transmit the weight of vehicle 2 to the terrain.

To strengthen carriage 3 and prevent abrasive material adhering to carrier rollers 19, carriage 3 is fitted with a metal outer guard 20 (shown partly in FIG. 1 for clarity).

On the opposite side to rollers 19 and inwards of track 12, carriage 3 is fitted with a pair of supporting rollers 21 (only the outer supporting roller 21 shown) which rotate about an axis parallel to axis 7 and serve to keep the top branch of track 12 more or less horizontal. In a variation not shown, traction device 1 may comprise, in known manner, two or more pairs of supporting rollers 21.

Being designed to guide and keep track 12 taut, idler wheel 10 is mounted to slide longitudinally on carriage 3 and, for this purpose, is fitted in rotary manner to a known fork 22 connected to a known spring-operated tensioning device 23 not described in detail.

Figure 4:
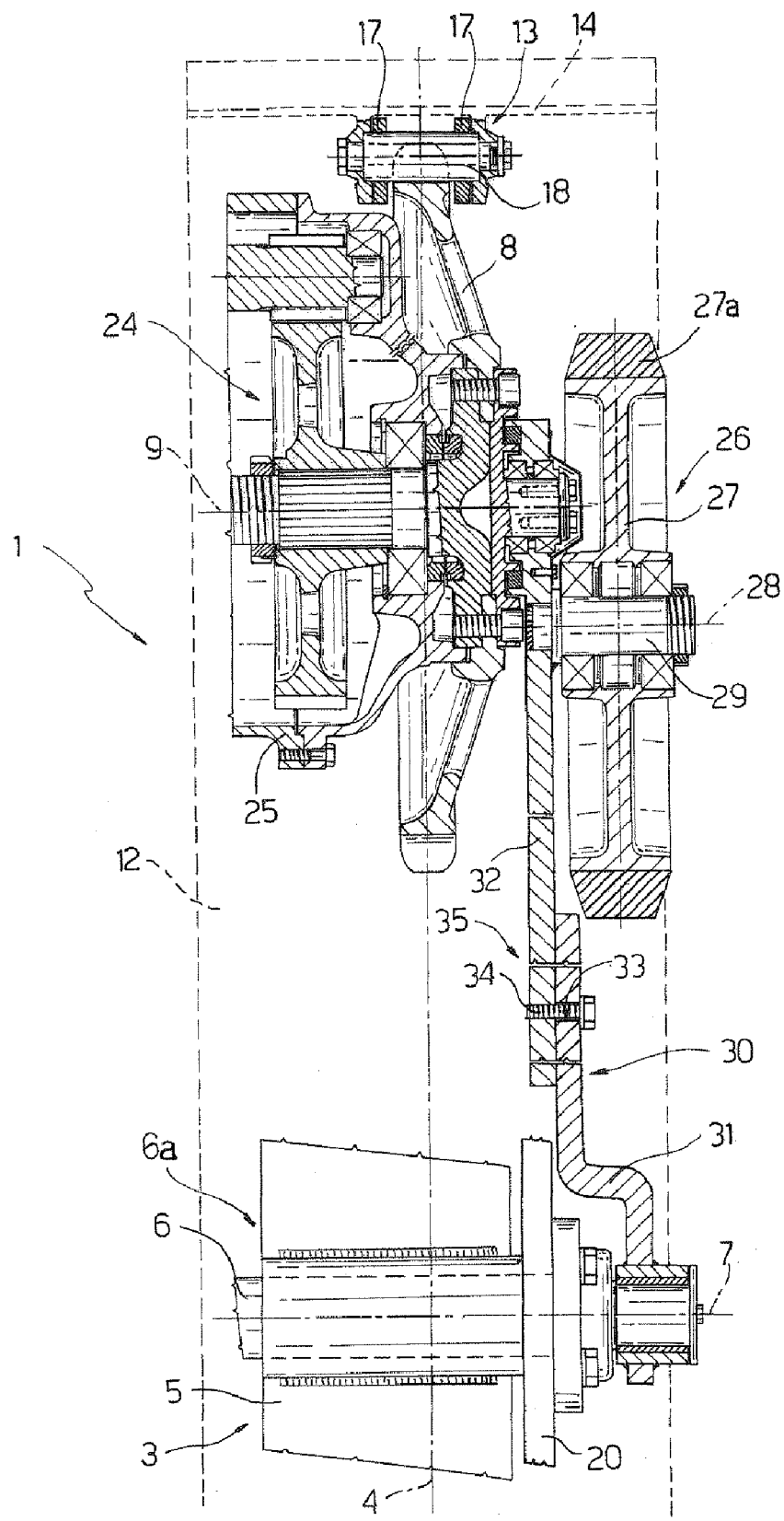
FIG. 4 shows a sectional view of the crawler traction device of FIG. 2. taken along line IV-IV.

As shown in FIG. 4, drive sprocket 8 is driven by an engine (not shown) of vehicle 2 via a known reduction gear 24 housed inside a housing 25.

Traction device 1 also comprises a damping device 26 for reducing noise and vibration produced by the moving track 12, partly by the teeth of drive sprocket 8 meshing with pins 18 of links 13, and partly by track 12 winding about idler wheel 10.

As shown in FIG. 1 and in more detail in FIG. 4, damping device 26 comprises an auxiliary roller 27, which is smaller in diameter than drive sprocket 8, is fitted to drive sprocket 8 to rotate about an axis 28 parallel to and frontwards of axis 9, and has a peripheral ring 27a of elastic material, preferably rubber, the outer surface of which is coaxial with axis 28 and only presses against surface 16 of shoes 14 along a portion of track 12 located, in use, immediately upstream from the meshing arc and interposed between auxiliary roller 27 and the terrain.

Figure 3:
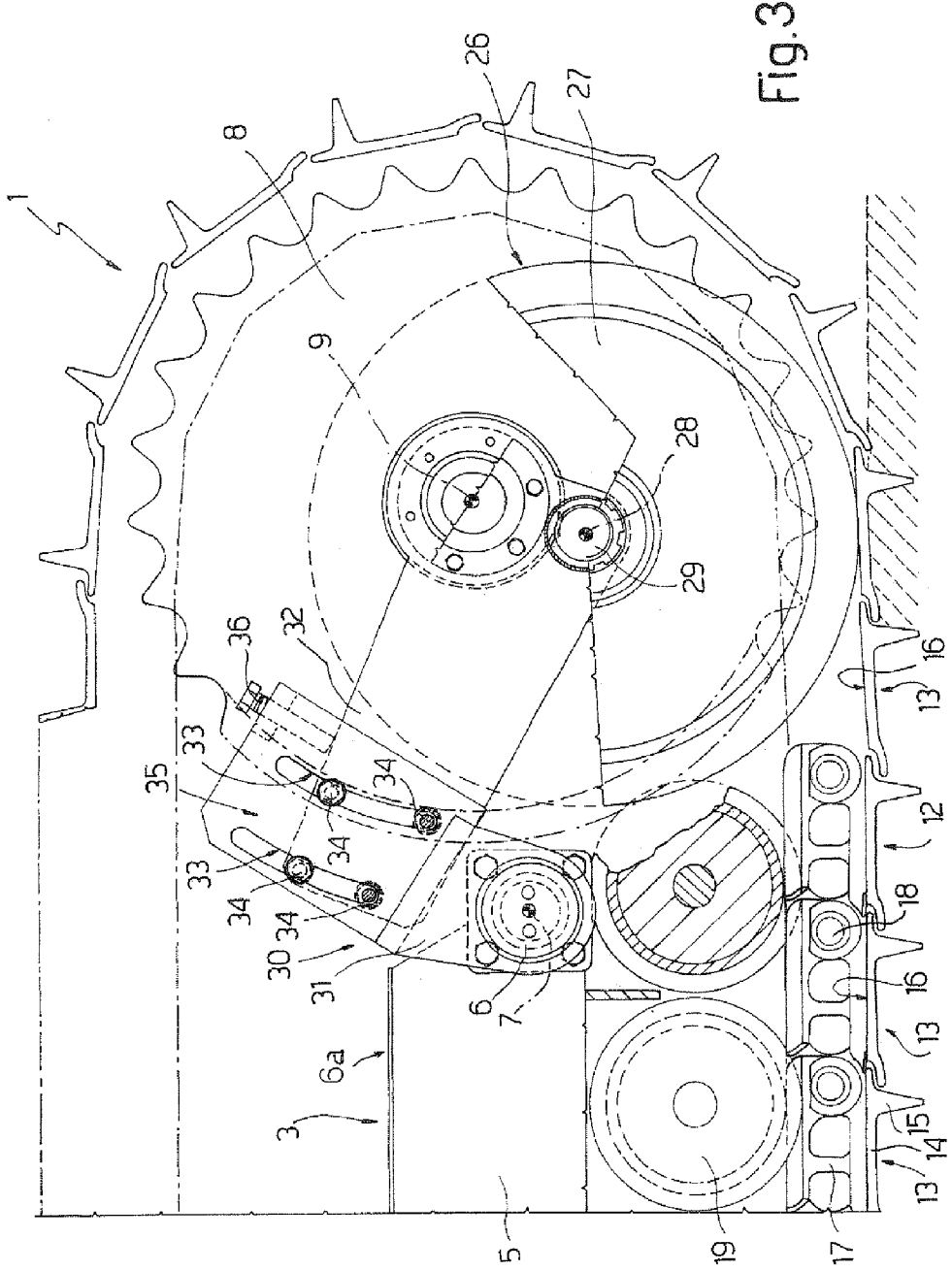

As shown in FIGS. 2, 3 and 4, auxiliary roller 27 is fitted in a rotary manner, by bearings, to a pin 29 coaxial with axis 28, and is connected rigidly to an L-shaped bracket 30 hinged at one end to drive sprocket 8 to oscillate about axis 9, and hinged at the opposite end, about axis 7, to an end portion of cross member 6.

Bracket 30 comprises two portions 31 and 32 connected integrally to each other, and of which portion 31 extends upwards from cross member 6 and has, on its free end, two curved slots 33 substantially concentric with axis 9 and engaged by respective pairs of screws 34 fitted to portion 32.

As shown in FIGS. 2 and 3, besides connecting portions 31 and 32, screws 34 also define, together with slots 33, an adjusting device 35 for adjusting the preload of auxiliary roller 27. That is, adjusting the position of the pairs of screws 34 along respective slots 33 adjusts, by rotating portion 32 about axis 9, the angular position of axis 28 about axis 9 to adjust the preload of auxiliary roller 27 on track 12 between a minimum preload setting (FIG. 2) and a maximum preload setting (FIG. 3).

In the example shown, the preload of auxiliary roller 27 is adjusted manually by a stop screw 36 fitted to portion 31 and pressing on portion 32. That is, after loosening screws 34 to move portion 32 with respect to portion 31, portion 32 can be rotated about axis 9 by simply screwing or unscrewing stop screw 36 to increase or reduce the preload of auxiliary roller 27 respectively.

In a variation not shown, bracket 30 as described above may support auxiliary roller 27 non-adjustably, and/or may comprise a single arm connected rigidly to part of frame 6a.

In another variation not shown, the preload of auxiliary roller 27 is adjusted by known electronic control systems which adjust the position of portion 32, and therefore the angular position of axis 28 about axis 9, automatically as a function of the operating condition of vehicle 2, e.g. the presence of an off-ground load, such as an implement, connected to the rear end of vehicle 2.

Regardless, therefore, of the position in which auxiliary roller 27 is locked with respect to drive sprocket 8, the distance between axis 28 of auxiliary roller 27 and axis 9 of drive sprocket 8 remains constant. Consequently, seeing as, once the position of auxiliary roller 27 is fixed, the distance between axis 28 and the portion of the meshing arc located at any time between auxiliary roller 27 and the terrain remains constant, it follows that the distance between axis 9 and the portion of the meshing arc also remains constant. In other words, being connected to drive sprocket 8 and pressing on track 12, auxiliary roller 27 maintains a constant distance between axis 9 of drive sprocket 8 and the terrain as track 12 advances, and, whenever a tooth engages the gap between pins 18 of two adjacent links 13, prevents drive sprocket 8 from slumping onto links 13 of track 12 and so generating noise and vibration.

Noise and vibration, as track 12 advances, are also caused by track 12 winding about idler wheel 10. That is, the severe angular acceleration to which links 13 of track 12 are subjected along the winding arc, in particular along the initial portion of the winding arc, about idler wheel 10 cause links 13 to bang sharply against the metal peripheral surface of idler wheel 10.

Figure 5:
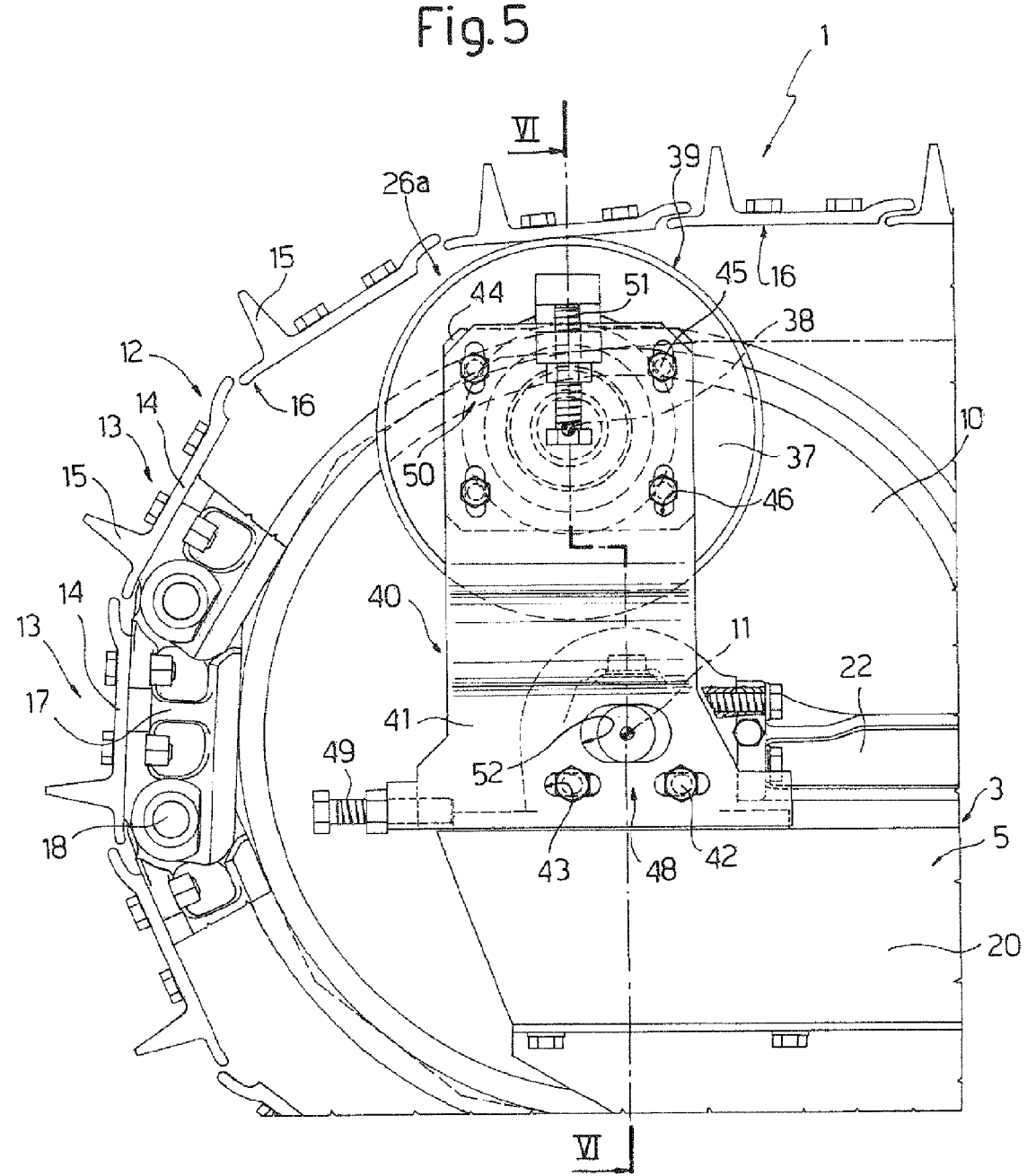
FIG. 5 shows a detailed view of the crawler traction device of FIG. 1.
Figure 6:
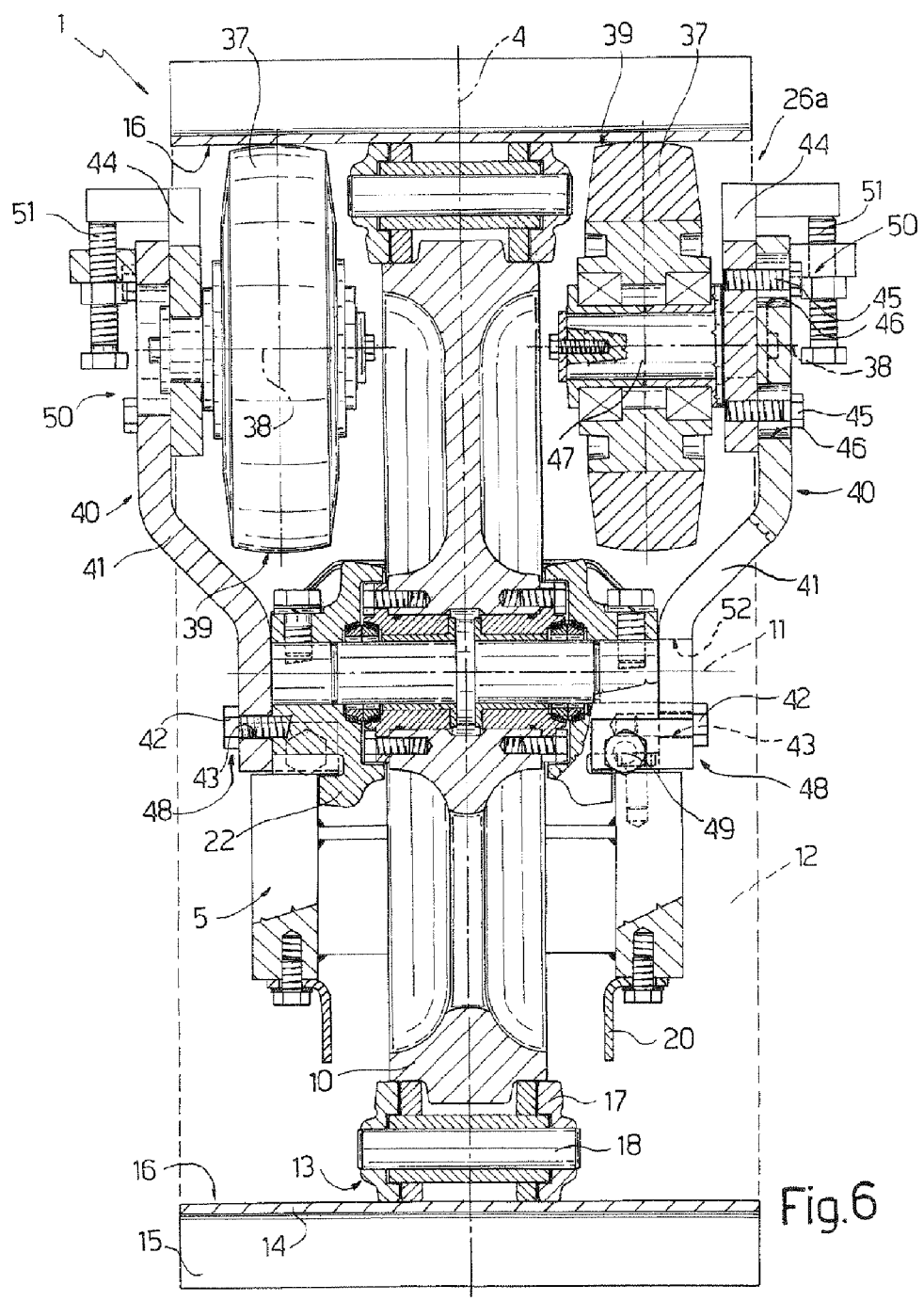
FIG. 6 shows a sectional view of the crawler traction device of FIG. 5. taken along line VI-VI.

As shown in FIG. 5 and FIG. 6, to eliminate this further noise source, damping device 26, in addition to a rear portion defined by auxiliary roller 27, also comprises a front portion 26a in turn comprising a pair of front rollers 37 located on opposite sides of idler wheel 10 and which, as explained in detail below, serve to support the portion of track 12 about to wind about idler wheel 10.

Front rollers 37 are smaller in diameter than idler wheel 10, are fitted to fork 22 to rotate, with respect to fork 22, about an axis 38 parallel to, above, and to the front of axis 11, and have respective rubber-coated peripheral surfaces 39 that press against surface 16 of links 13 to support track 12 along an initial portion of the winding arc of track 12 about idler wheel 10.

The supporting action of front rollers 37 greatly reduces noise and vibration caused, as is known, by track 12 winding about idler wheel 10, and by links 13 banging against the metal surface of idler wheel 10. This occurs, in particular, along the initial portion of the winding arc of track 12 about idler wheel 10, on account of the severe angular acceleration of links 13 as they are rotated about axis 11, and also on account of the sharp upward movement to which track 12 is very often subjected along the initial portion of the winding arc. That is, on reaching idler wheel 10, track 12, as opposed to being perfectly tangent to idler wheel 10, is held down by its own weight and, at times, by insufficient tension.

Because front rollers 37 support the portion of track 12 reaching idler wheel 10, impact of links 13 against idler wheel 10 occurs on the rubber surface of front rollers 37, as opposed to the metal surface of idler wheel 10, thus damping noise and vibration.

Front rollers 37 also provide for supporting and guiding track 12, and so aligning it perfectly with idler wheel 10, regardless of the tension of track 12 and, hence, the shape of the top branch of track 12 upstream from idler wheel 10.

As shown in FIG. 5 and FIG. 6, each of front rollers 37 (only the outer front roller 37 is shown in FIG. 5) is fitted adjustably to fork 22 by a respective bracket 40 comprising a bottom portion 41 fitted integrally to fork 22 by two screws 42 engaging respective longitudinal slots 43 in bottom portion 41; and a top portion 44, which is fitted integrally to bottom portion 41 by four screws 45 engaging respective slots 46 crosswise to slots 43, and supports relative front roller 37 in rotary manner by a pin 47 coaxial with axis 38.

Besides connecting bottom portion 41 to fork 22, screws 42 and slots 43 of each bracket 40 define an adjusting device 48 for adjusting the longitudinal position of relative front roller 37. That is, by loosening screws 42 to slide them along respective slots 43, bottom portion 41 is movable longitudinally with respect to fork 22 by screwing or unscrewing a stop screw 49, fitted to bottom portion 41 and pressing against fork 22, to move front roller 37 frontwards or rearwards and so increase or reduce the preload of front roller 37 respectively.

Similarly, besides connecting bottom portion 41 to top portion 44, screws 45 and slots 46 of each bracket 40 form part of an adjusting device 50 for adjusting the height of relative front roller 37. That is, by loosening screws 45 to slide them along respective slots 46, top portion 44 is movable vertically with respect to bottom portion 41 by screwing or unscrewing a stop screw 51, fitted to bottom portion 41 and pressing against top portion 44, to move front roller 37 upwards or downwards and so increase or reduce the preload of front roller 37 respectively.

As shown in FIG. 5, bracket 40 has a slot 52 at axis 11 to permit easy access by the user to a connection for a greasing device by which to grease the pin of idler wheel 10. Slot 52 may either be formed in both brackets 40 or only in the bracket 40 of outer front roller 37. The above structure makes idler wheel 10 and front rollers 37 integral with one another with respect to longitudinal movement of idler wheel 10 by tensioning device 23.

The size of each front roller 37 with respect to idler wheel 10 is selected while considering opposing requirements: the diameter of front roller 37, on the one hand, must be small enough for track 12 to wind correctly about idler wheel 10, and, on the other, must be large enough to achieve sufficient contact between its peripheral surface 39 and surface 16 of shoes 14 to effectively dampen vibration and guide track 12.

Finally, it should be pointed out that, the longitudinal position of each front roller 37 being adjustable independently of the other front roller 37, the two front rollers 37 may be set to respective, even slightly offset, longitudinal positions to increase the overall roller-track contact area and advantageously improve support and guidance of track 12 by front rollers 37 as a whole.

Figure 7:
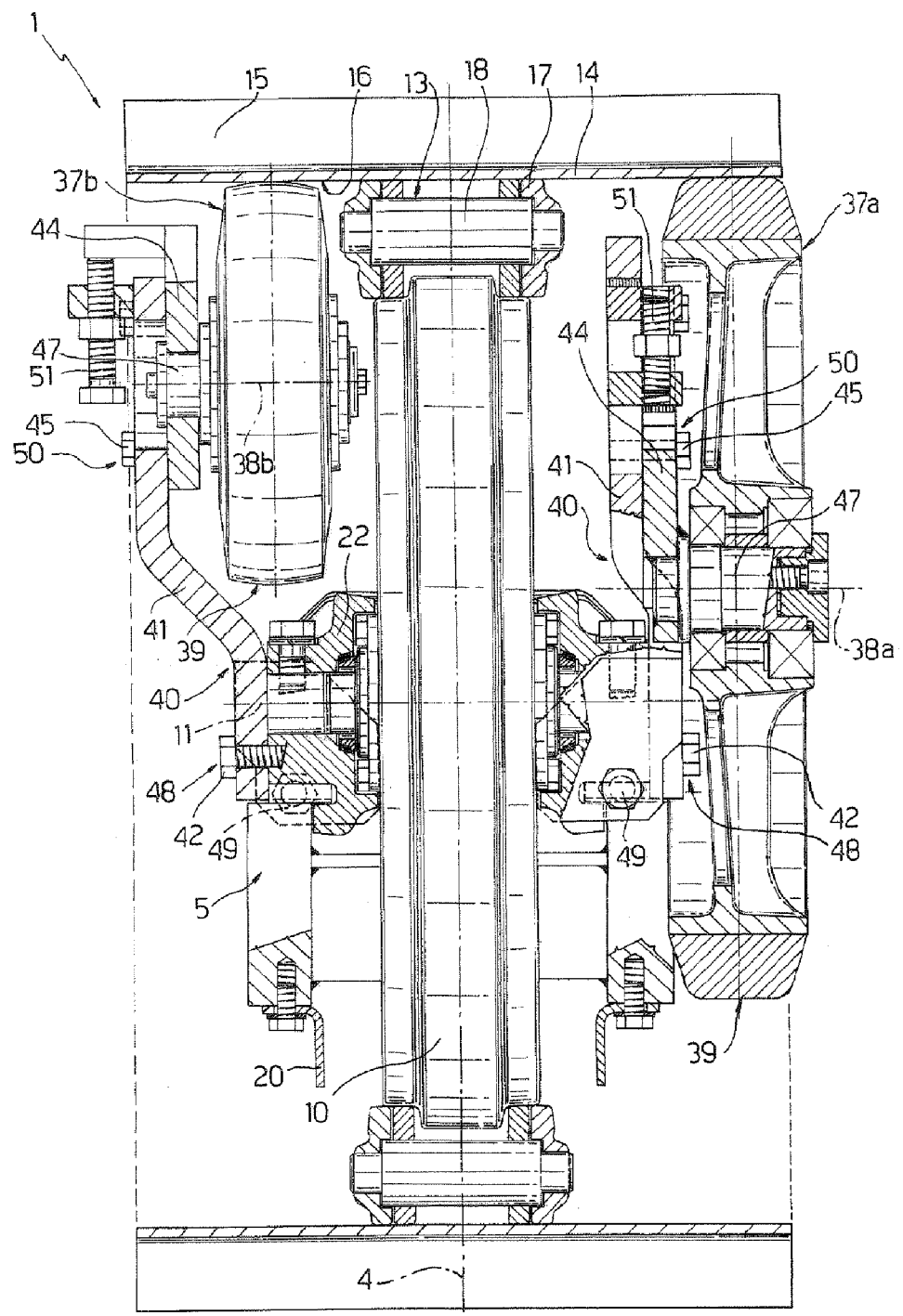
FIG. 7 shows a detailed view of a second embodiment of the crawler traction device.

The above advantage may be achieved even more effectively by the FIG. 7 variation, in which front rollers 37 are of different diameters. More specifically, in the example shown, the outer front roller 37a is larger in diameter than the inner front roller 37b. In this case, obviously, the two front rollers 37, as opposed to rotating about the same axis, rotate about respective parallel axes 38a and 38b. Moreover, for reasons of size, bracket 40 for supporting and adjusting front roller 37a is located between idler wheel 10 and front roller 37a.

Figure 8:
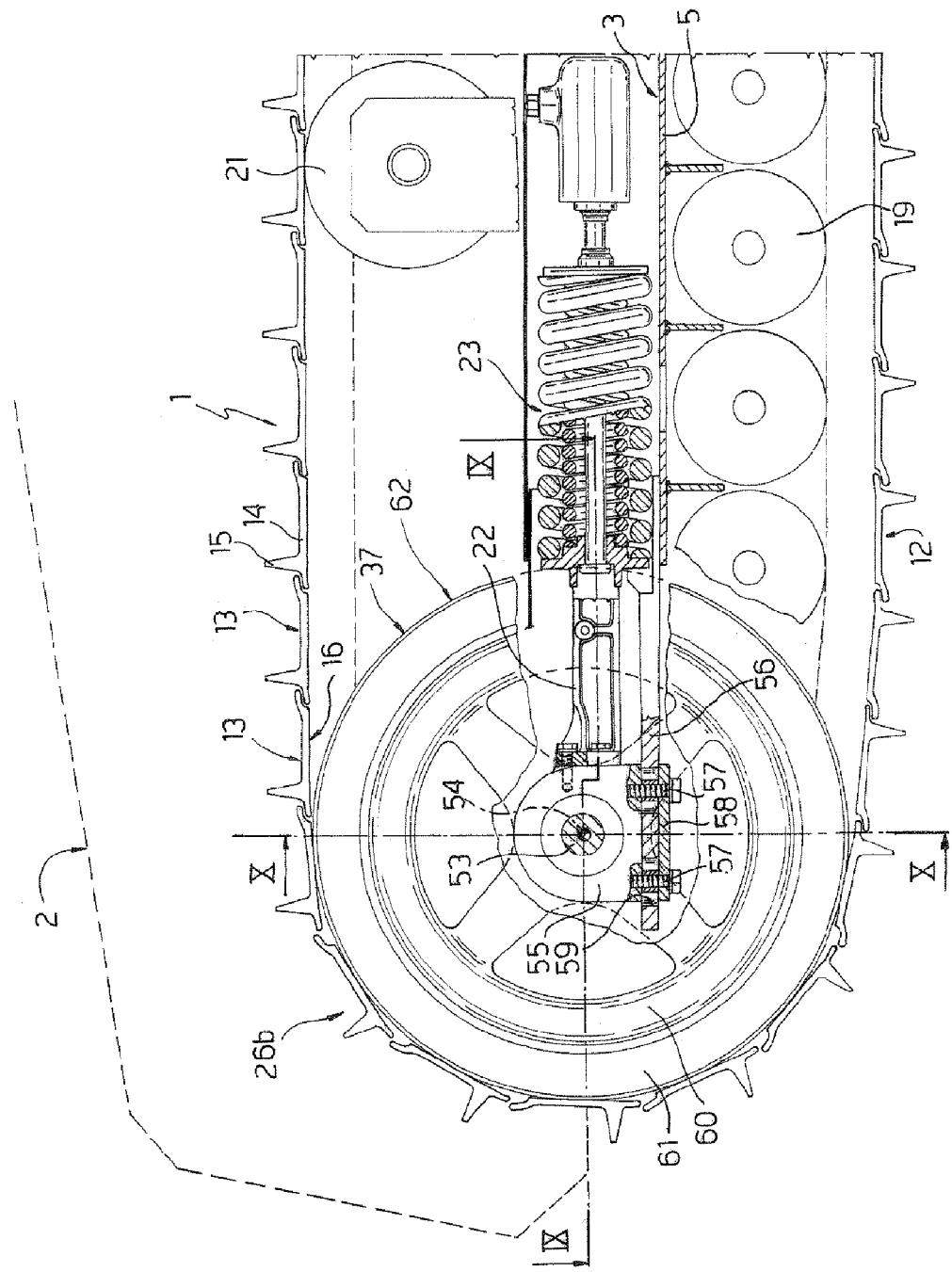
FIG. 8 shows a detailed view of a third embodiment of the crawler traction device.
Figure 9:
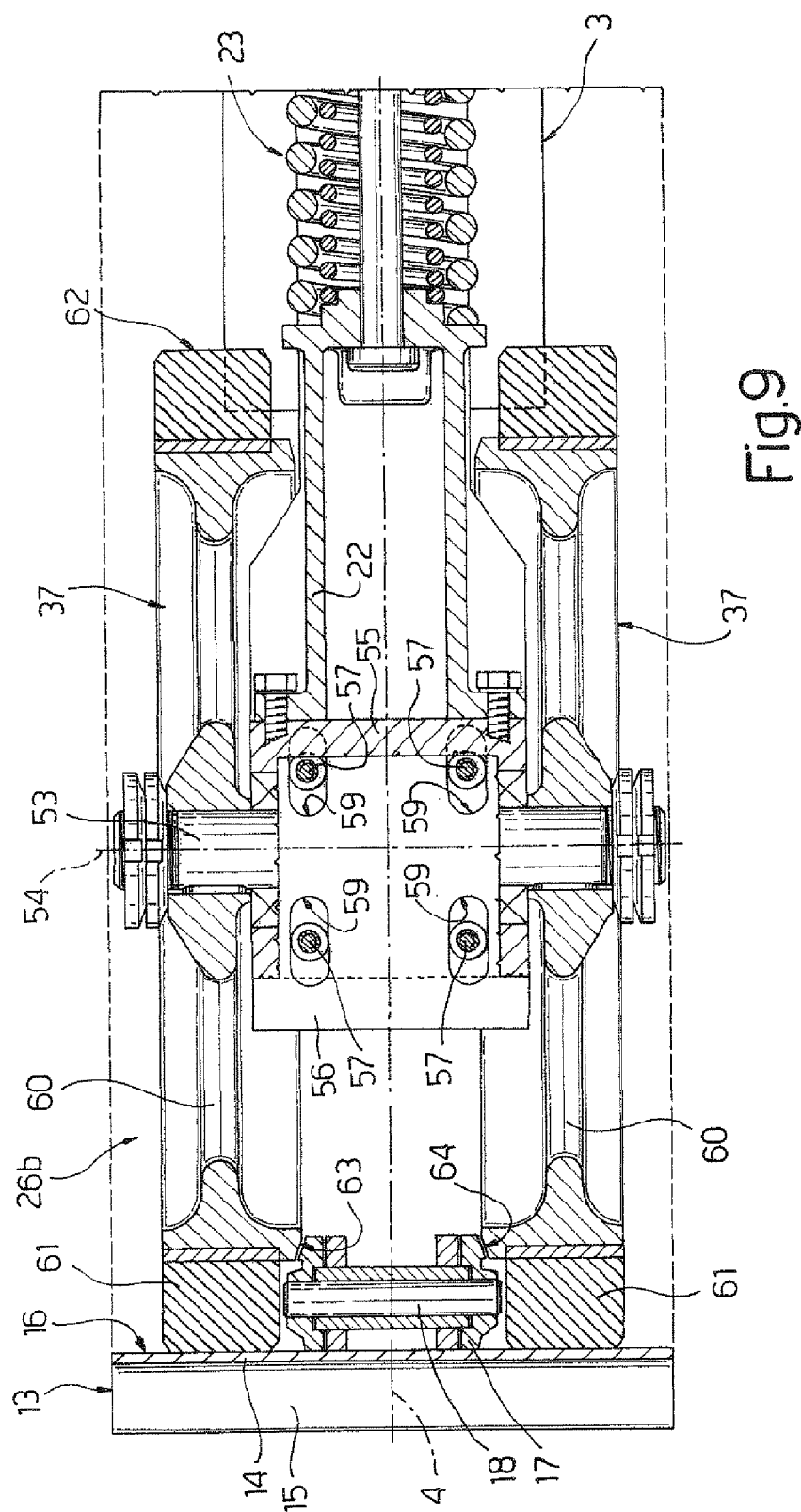
FIG. 9 shows a sectional view of the crawler traction device of FIG. 8 taken along line VI-VI.
Figure 10:
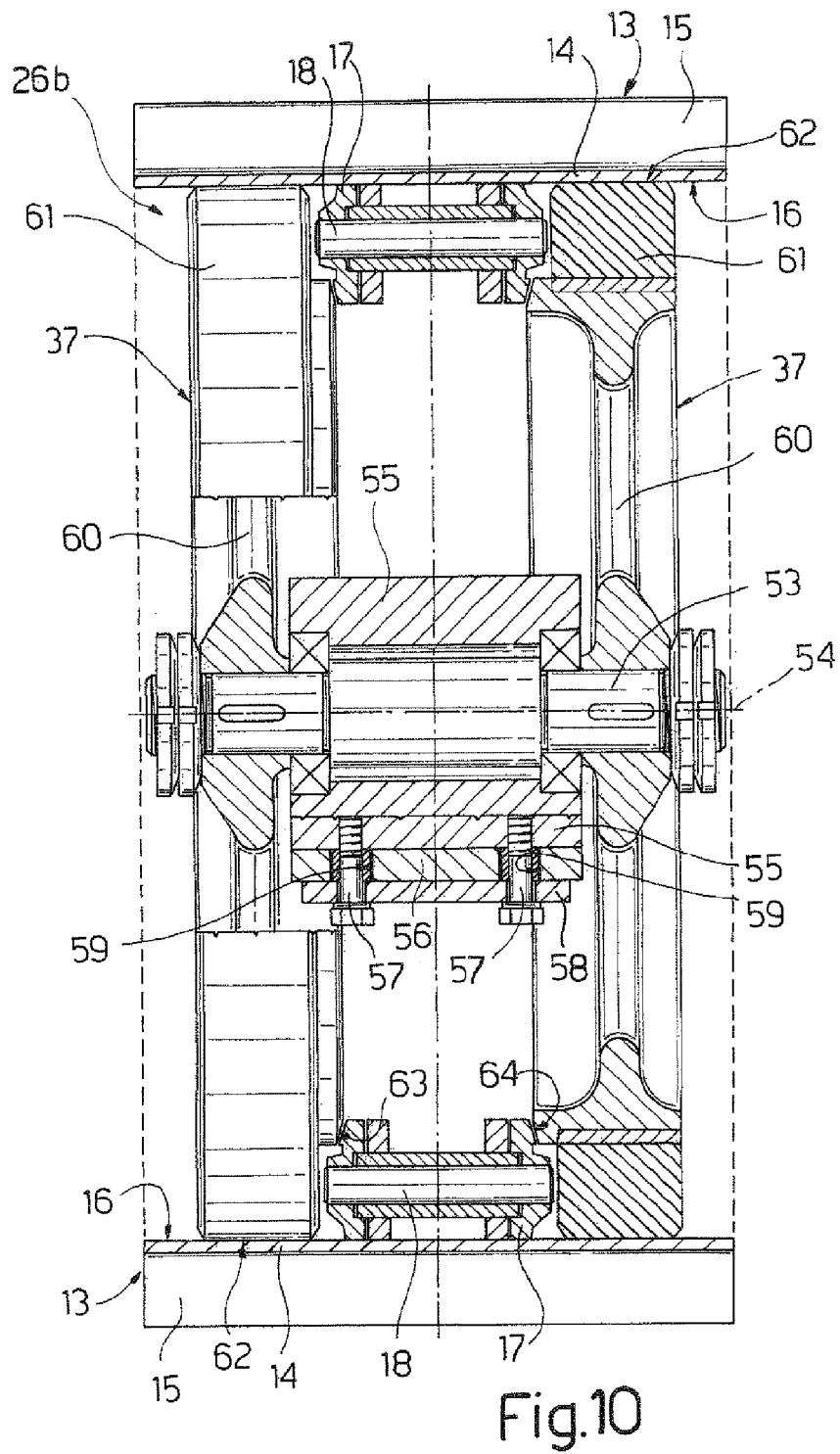
FIG. 10 shows a sectional view of the crawler traction device of FIG. 8 taken along line X-X.

FIG. 8 to FIG. 10 show a further variation 26b of the front portion of damping device 26, in which front rollers 37 press against surface 16 of shoes 14 along the whole winding arc, and together replace idler wheel 10. As shown in FIG. 8 and in more detail in FIG. 9 and FIG. 10, front rollers 37 of front portion 26b are fitted to a pin 53 to rotate about an axis 54 (coincident with axis 11 of idler wheel 10 of front portion 26a) parallel to axis 9 and movable longitudinally to adjust the tension of track 12 by front rollers 37 and tensioning device 23. More specifically, pin 53 is fitted in rotary manner, with the interposition of bearings, to a support 55 which is integral with the free end of fork 22 and is slid by fork 22 along a bracket 56 integral with carriage 3.

As shown in FIG. 9 and FIG. 10, support 55 is connected slidably to bracket 56 by four screws 57 located between support 55 and a counterplate 58, with the interposition of bracket 56, and engaging respective longitudinal slots 59 in bracket 56. Each front roller 37 comprises a spoked hub 60 fitted with a peripheral ring comprising an outer layer 61 of elastic material, preferably cured rubber, the peripheral surface 62 of which is in constant contact with surface 16 of shoes 14 along the whole winding arc. On the side facing the other hub 60, each hub 60 has a conical annular surface 63 which cooperates with a tapered lateral surface 64 of links 13 to align and guide track 12 along the whole winding arc about front rollers 37. Operation of damping device 26 will be clear from the above description, with no further explanation required.

Having thus described the invention, what is claimed is:

1. A crawler traction device for a crawler vehicle, the crawler traction device comprising:
   a frame;
   a carriage having a longitudinal axis;
   a rear drive sprocket fitted to the frame to rotate about a first axis crosswise to the longitudinal axis;
   a front idler, fitted to the carriage to rotate about a second axis, parallel to the first axis;
   a track looped about the drive sprocket and the front idler, and meshing with the drive sprocket along a meshing arc; and
   a damping device having an auxiliary roller rotating about a third axis separate from the first axis, wherein the auxiliary roller is smaller in diameter than the drive sprocket, and configured to only cooperate with the track along a first portion of the track that is located adjacent to and forward of the meshing arc with respect to the longitudinal axis.

2. The crawler traction device of claim 1, wherein the third axis is parallel to the first axis, and is located below and forward of the first axis with respect to longitudinal axis.

3. The crawler traction device of claim 1, wherein the track comprises a chain of links, each of which comprises a respective shoe bounded internally by a flat surface; and wherein the auxiliary roller has a peripheral surface coaxial with the third axis and in constant contact with the flat surface at the first of the track.

4. The crawler traction device of claim 1, wherein the damping device comprises an adjusting device for adjusting the preload of the auxiliary roller.

5. The crawler traction device of claim 4, wherein the auxiliary roller is mounted for rotation on a bracket interposed between the frame and the first axis.

6. The crawler traction device of claim 5, wherein the bracket comprises a first portion fitted to the frame; and a second portion rotatably connected to the auxiliary roller, and is rotatably connected to the drive sprocket.

7. The crawler traction device of claim 6, wherein the adjusting device for adjusting the preload of the auxiliary roller is interposed between the first and second portion, and comprises a pair of slots formed in the first portion and substantially concentric with the first axis; and screws fitted to the second portion and engaging the slots, and which lock the second portion with respect to the first portion during normal operation, and are movable along the slots, during adjustment, to permit rotation of the second portion, together with the third axis, about the first axis.

8. The crawler traction device of claim 7, wherein the adjusting device for adjusting the preload of the auxiliary roller comprises stop and adjusting means interposed between the first and second portion to adjust the position of the second portion with respect to the first portion.

9. The crawler traction device of claim 1, wherein the auxiliary roller comprises a peripheral ring of elastic material.

10. The crawler traction device of claim 1, wherein the idler comprises an idler wheel rotating about the second axis; and the damping device comprises a front portion comprising a pair of front rollers, which are located on opposite sides of the idler wheel to rotate about respective axes of rotation parallel to each other and to the second axis, have respective diameters smaller than that of the idler wheel, and only cooperate with the track along an initial portion of the winding arc of the track about the idler wheel.

11. The crawler traction device of claim 10, wherein the front rollers have different diameters, and rotate about the respective parallel axes of rotation.

12. The crawler traction device of claim 10, wherein the track comprises a chain of links, each of which comprises a respective shoe bounded internally by a flat surface; and wherein each front roller has a respective peripheral surface coaxial with the relative axis of rotation and in constant contact with the flat surface at the initial portion.

13. The crawler traction device of claim 12, wherein the peripheral surface of each front roller is made of elastic material.

14. The crawler traction device of claim 10, wherein the idler wheel is fitted to a fork connected to the carriage by a tensioning device to allow the idler wheel to slide in a direction parallel to the longitudinal axis; the front rollers being fitted in a rotary manner to the fork.

15. The crawler traction device of claim 14, wherein the damping device comprises, for each front roller, an adjusting device for adjusting the position of the front roller with respect to the fork.

16. The crawler traction device of claim 14, wherein each front roller is fitted to the fork by a bracket lockable in a longitudinally adjustable position with respect to the fork.

17. The crawler traction device of claim 16, wherein the adjusting device for adjusting the longitudinal position comprises a pair of longitudinal slots formed in the bracket; and screws engaging the slots, and which lock the bracket with respect to the fork during normal operation, and are movable along the slots, during adjustment, to permit longitudinal movement of the bracket with respect to the fork.

18. The crawler traction device of claim 16, wherein the bracket comprises a first portion connected to the fork; and a second portion which supports the relative front roller in a rotary manner, and is connected adjustably to the first portion; and wherein the adjusting device for adjusting the height comprises a number of slots formed in the first portion and extending substantially crosswise to the longitudinal axis; and screws engaging the slots, and which lock the second portion with respect to the first portion during normal operation, and are movable along the slots, during adjustment, to permit vertical movement of the second portion, together with a relative front roller, with respect to the first portion.

19. The crawler traction device of claim 1, wherein the idler defines a front portion of the damping device, and comprises a pair of identical front rollers fitted to a fork to rotate about the second axis; the fork being connected to the carriage by a tensioning device to allow the front rollers to slide in a direction parallel to the longitudinal axis, wherein each front roller has a peripheral surface of elastic material.

20. The crawler fraction device of claim 19, wherein the track comprises a chain of links, each of which comprises a respective shoe bounded internally by a flat surface; and wherein the peripheral surface of each front roller is in constant contact with the flat surface along the whole winding arc of the track about the front rollers.

21. The crawler traction device of claim 20, wherein, on the side facing the other front roller, each front roller has a respective conical annular surface that cooperates with a relative tapered lateral surface of the links to align and guide the track along the whole winding arc.

22. A crawler traction device for a crawler vehicle, the crawler traction device comprising:
 a frame;
 a carriage having a longitudinal axis;
 a rear drive sprocket fitted to the frame to rotate about a first axis crosswise to the longitudinal axis;
 a front idler wheel fitted to the carriage to rotate about a second axis parallel to the first axis; a track looped about the drive sprocket and the idler wheel and meshing with the drive sprocket along a meshing arc; and
 a damping device comprising a pair of front rollers, which are located on opposite sides of the idler wheel and having respective axes of rotation parallel to each other and to the second axis, separate from the axis of the idler wheel, a portion of the idler wheel extending into a gap between the pair of front rollers, the pair of front rollers have respective diameters smaller than that of the idler wheel, and only cooperate with the track along an initial portion of a winding arc of the track about the idler wheel.

23. The crawler traction device of claim 22, wherein the track comprises a chain of links, each of which comprises a respective shoe bounded internally by a flat surface; and wherein each front roller has a respective peripheral surface coaxial with the relative axis of rotation and in constant contact with the flat surface at the initial portion, wherein the peripheral surface of each front roller is made of elastic material.

24. The crawler traction device of claim 22, wherein the idler wheel is fitted to a fork connected to the carriage by a tensioning device to allow the idler wheel to slide in a direction parallel to the longitudinal axis; the front rollers rotatably mounted to the fork for longitudinal movement with the idler wheel by the tensioning device and wherein the damping device comprises, for each front roller, an adjusting device for adjusting the position of the front roller with respect to the fork.

* * * * *